United States Patent [19]

Porner

[11] 4,099,269

[45] Jul. 11, 1978

[54] PROTECTIVE DEVICE

[76] Inventor: Miroslav Joseph Porner, 24 Bracken Ave., Epsom, Auckland, New Zealand

[21] Appl. No.: 763,510

[22] Filed: Jan. 28, 1977

[30] Foreign Application Priority Data

Feb. 4, 1976 [NZ] New Zealand .................. 179918

[51] Int. Cl.² .................. A41D 13/08; B68C 5/00
[52] U.S. Cl. .................. 2/16; 2/22; 54/82
[58] Field of Search .................. 2/22, 23, 24, 2, 16, 2/DIG. 6; 54/66, 82

[56] References Cited

U.S. PATENT DOCUMENTS

| 911,479 | 2/1909 | Doughty et al. | 2/24 UX |
|---|---|---|---|
| 1,945,226 | 1/1934 | Lutsche | 2/24 UX |
| 2,589,636 | 3/1952 | Smith | 2/16 |
| 3,322,118 | 5/1967 | Sotherlin | 2/24 X |
| 3,465,364 | 9/1969 | Edelson | 2/DIG. 6 |

Primary Examiner—Alfred R. Guest

[57] ABSTRACT

The invention relates to a protective device such as can be used for protecting the limbs of humans, or for example for protecting animals such as for example the fetlocks of horses. The invention provides for a protective device including at least one and preferably a plurality of juxtaposed layers of substantially resilient and shock absorbant material, located within an outer covering. The substantially resilient and shock absorbant material is preferably in the form of sheet material integrally formed with open faced studs or pockets, and closed by a backing material, so that a plurality of air pockets are formed within the sheet material. This substantially resilient and shock absorbant material, when located within an outer covering, cushions blows or forces applied to the area to be protected. In one form of the invention, means are provided on an outer surface of the protective device to enable the device to be located relative to an area to be protected. In one form of the invention, the locating means is in the form of a plurality of spaced apart and juxtaposed strips of hooked material which will engage with clothing and the like which may be located about or adjacent the protective device.

7 Claims, 12 Drawing Figures

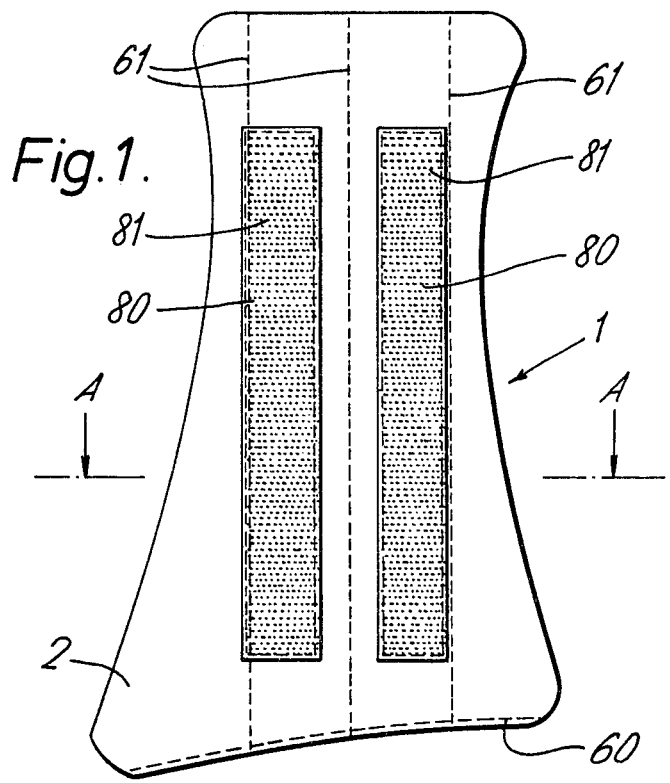
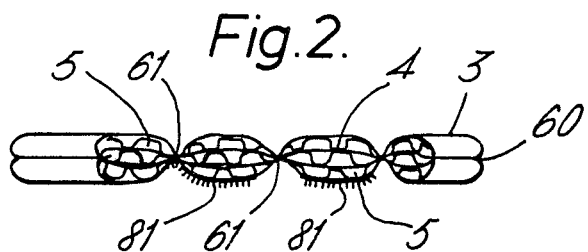
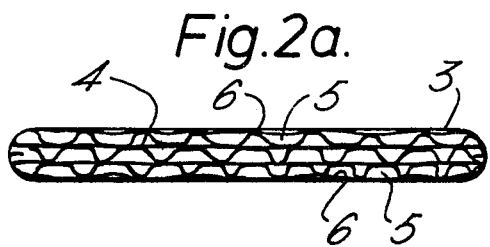

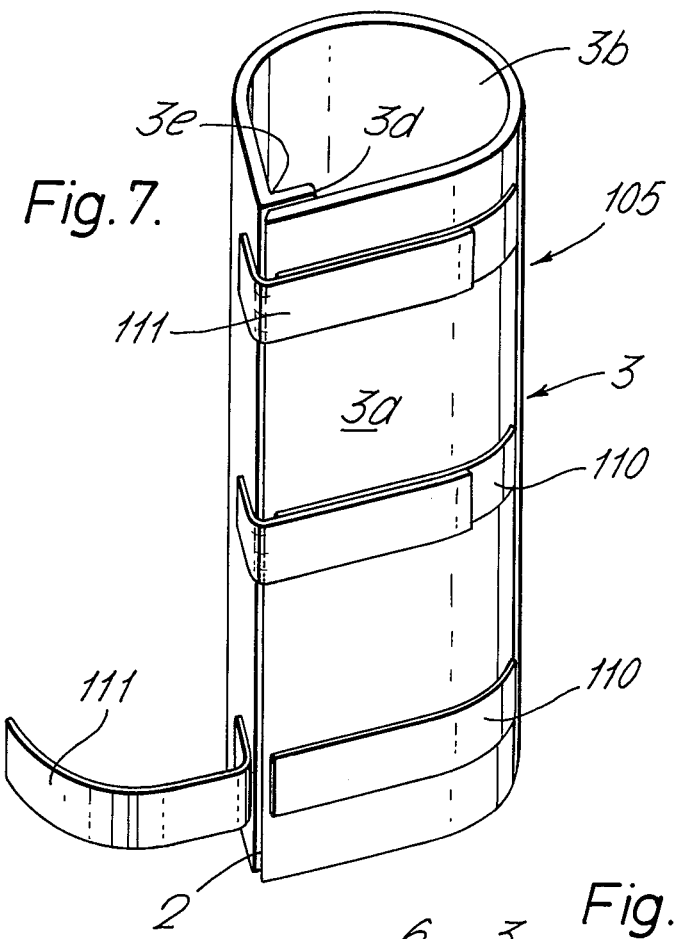
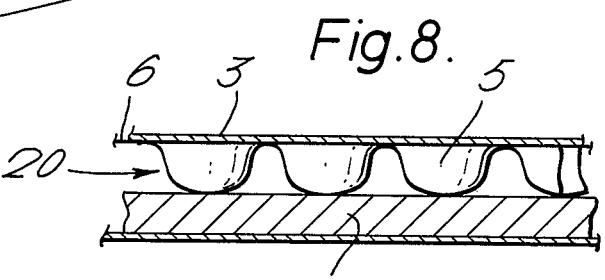
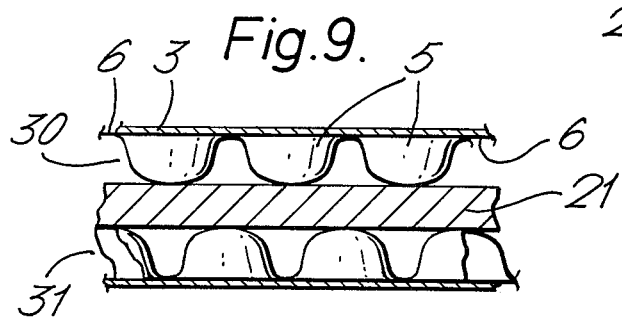

PROTECTIVE DEVICE

This invention relates to protective devices and more particularly to a protective device which is able to be used for the protection of parts and limbs of the human body, and for the protection of parts of the bodies of animals.

Protective devices, for example shin pads, shoulder pads, leg pads and the like have been provided for many years, for use in protecting various parts and limbs of human and animal bodies.

For example, such pads have been used in rugby, soccer, cricket, hockey and the like and have previously been manufactured by the provision of a number of rigid and usually heavy and hard strips of material covered by a suitably strong material. The strips have in the past been manufactured of cane, steel, fibreglass or other strong and heavy material and while they have provided protection for various parts of the body, they have had the disadvantage in that they have been lacking in flexibility, when located within a cover material such as for example canvas, leather, or other strong material. They have also been heavy and cumbersome to use and difficult to conform to the body of a user.

In addition, protection means such as bandages and the like have been provided for protecting various parts of animals such as for example the fetlocks of horses. However, this has been time consuming and difficult in location and generally inefficient.

It is therefore an object of this invention to provide a straight forward and efficient protective device which is able to be used in the protection of the various parts of the human body and also in the protection of various parts of animal bodies.

It is also an object of this invention to go at least some way to overcome problems associated with previous protective devices.

Other objects of this invention will become apparent from the following description.

According to one aspect of this invention there is provided a protective device including at least one layer of a substantially resilient and shock absorbing material, within an outer cover, the arrangement being such that the substantially resilient and shock absorbing material enables the protective device to provide a protective cushioning.

According to a further aspect of this invention there is provided a protective device and wherein a plurality of layers of substantially resilient and shock absorbing material are provided, in juxtaposition one with the other and within said outer covering, the arrangement being such that the substantially resilient and shock absorbing material provides a protective cushioning.

The invention will now be described by way of example, and with reference to the accompanying drawings, wherein:

FIG. 1 is a front view of a protective device in the form of a shin pad, according to one form of the invention.

FIG. 2 is a sectional view along arrows A—A of FIG. 1.

FIG. 2a is a cross sectional view of an alternative of the shin pad of FIG. 1.

FIG. 7 is a view of a fetlock cover as used for horses according to one form of the invention.

FIG. 8 is a cross sectional view of the fetlock cover shown in FIG. 7 of the drawings.

FIG. 9 is a cross sectional view of an alternative view of FIG. 7 of the accompanying drawings.

It should be appreciated that the present invention has application to numerous and indeed all protective devices. Some of these have been mentioned above and of course include pads and protective devices for the shins and numerous limbs, such as legs, such as may be used in soccer, cricket, rugby, hockey and the like. Also it will be appreciated that the protective device for use on animals such as horses, can be used for numerous parts of the body. However, the present invention will be described more particularly with reference to a shin pad for use with humans and to a fetlock cover for use with horses. It must however be stressed that the invention has equal application to other forms of protection, such as for example cricket pads, hockey pads and the like for protection of human limbs and indeed to protective devices for other parts of animal bodies. The present invention provides an efficient and lightweight protective cover.

Figure 3:
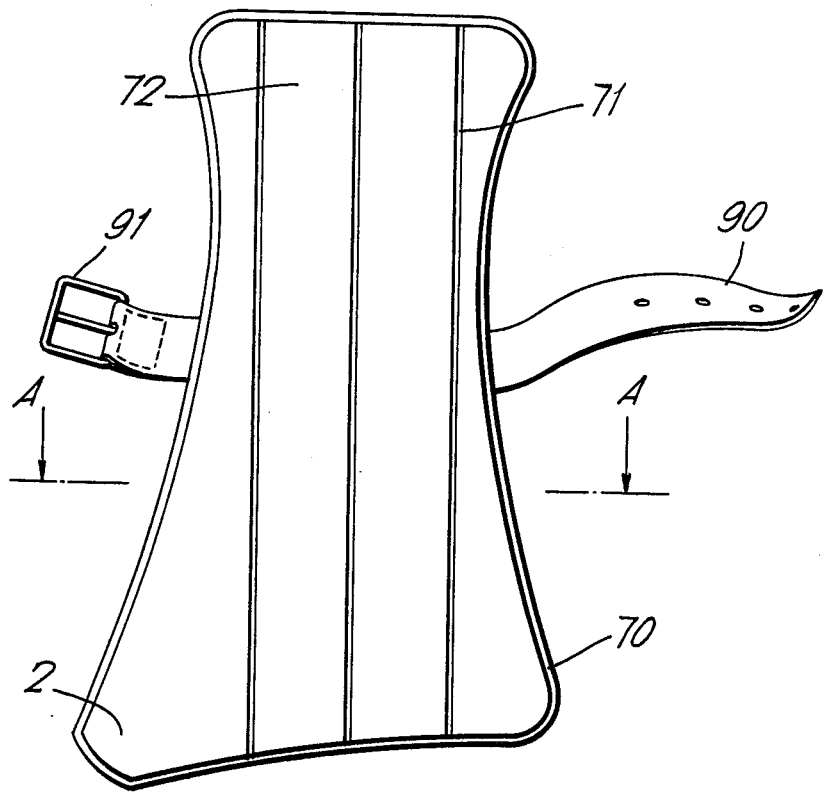
FIG. 3 is a front view of a shin pad according to a further form of the invention.

Referring to FIGS. 1, 2 and 3 of the accompanying drawings. A shin pad 1 is shown, which is generally shaped to facilitate location about the shin of a user and is provided with an elongate lower lobe portion 2, which is adapted to wrap around the ankle of a user, so as to be placed about the ankle to provide protection therefor.

The outer covering 3 is formed of any desirable material, such as for example vinyl, plastics, leather or any other suitable material. Preferably two such layers of material are provided as shown in FIG. 2 of the accompanying drawings, and these are heat sealed or stitched together such as shown in the FIG. 2 of the accompanying drawings, to provide an outer housing within which is located the substantially resilient and shock absorbing material.

The outer covering is in the form of two outer layers attached together, such as about their peripheries to enclose the substantially resilient and shock absorbing material. Alternatively the covering can be in the form of an envelope, or in the form of sheet material wrapped about the inner layer(s).

The substantially resilient and shock absorbing material (hereinafter referred to as shock absorbing material) is in this form of the invention, in the form of at least one layer of a suitable sheet material 4 which is integrally formed with a plurality of spaced apart hollow bubbles or pockets 5, generally in the form of studs, which are open faced and which provide for air pockets within the sheet of material. The studs can be provided with indented or concave upper surfaces. With each sheet of shock absorbing material a lower layer of cover material 6 is provided and is in one form of the invention adhered thereacross or attached in some other suitable way, so as to enclose and form air pockets in the bubbles or pockets 5.

It will be appreciated that the formation of the air pockets within the shock absorbing material (be there one layer or a plurality of layers) forms shock and blow absorbing pockets, which absorb shock and force, such as might be applied during sport, horse riding and the like.

In this respect, reference is made to the accompanying drawings which show a plurality of such layers of material, in juxtaposition one with the other such as shown in FIGS. 2 and 2a of the accompanying drawings.

The layers of shock absorbing material can be juxtaposed relative to one another in numerous patterns. In addition, as stated hereinbefore only one single layer of shock absorbing material 4 can be provided.

Figure 4:
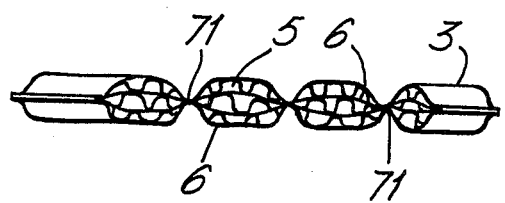
FIG. 4 is a sectional view along arrows A—A of FIG. 3 of the accompanying drawings.

Referring to FIGS. 2, 2a and 4 of the drawings, it will be seen that the bubbles or pockets 5 are in different patterns, facing rearwardly and forwardly of the protective device.

Figure 5:
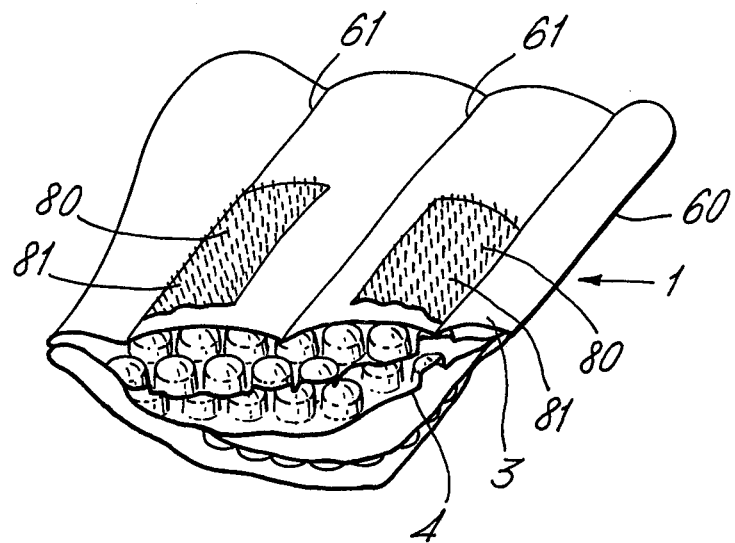
FIG. 5 is a partially perspective exploded view of a shin pad according to one form of the invention and as generally shown in FIG. 1 of the accompanying drawings.
Figure 6:
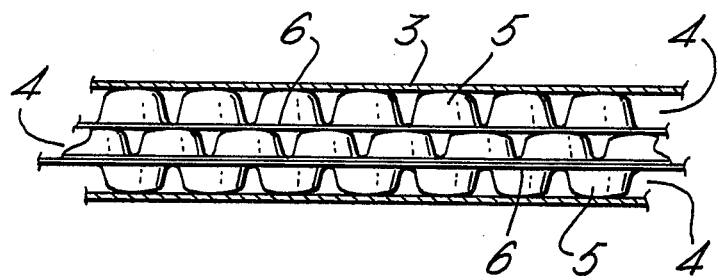
FIG. 6 is a diagrammatic cross sectional view of layers of resilient and shock absorbing material as contained within a protective device according to the present invention.

In FIGS. 5 and 6 of the drawings, the bubbles or pockets 5 are shown in the form of two layers, facing towards the front of the shin pad with one further juxtaposed layer facing rearwardly. This has been found to distribute any force applied to the protective device.

FIGS. 8 and 9 of the drawings, while referring to a fetlock cover for animals have equal application to other protective devices, such as shin pads. FIG. 8 shows a single layer of shock absorbing material 20 and a single and juxtaposed layer of a foam material 21 within the covering 3.

FIG. 9 shows two spaced apart layers of shock absorbing material 30 and 31 spaced apart one from the other by a medial foam layer or strip 21.

Figure 10:
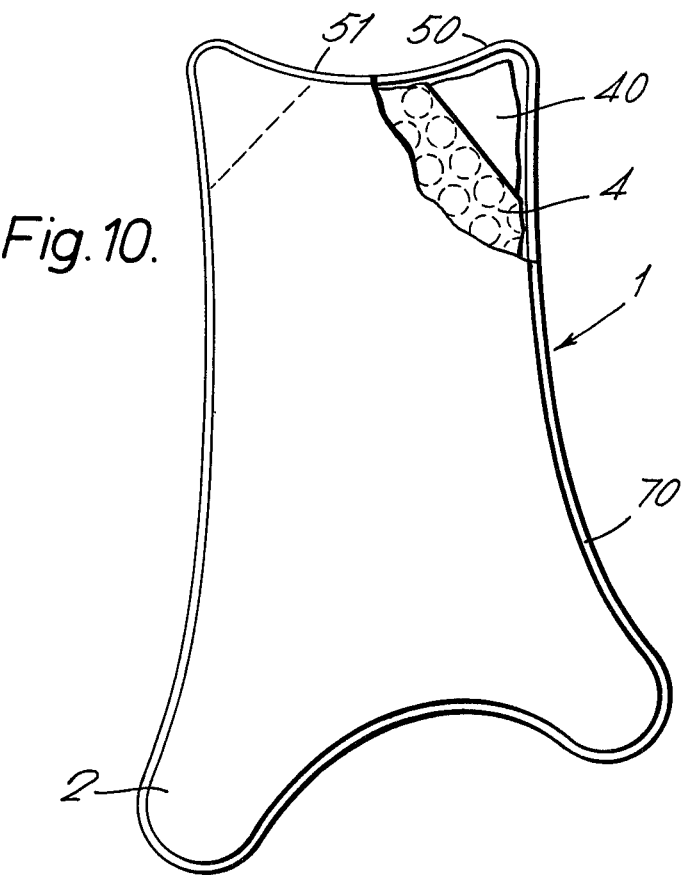
FIG. 10 is a partially exploded front view of a shin pad.
Figure 10A:
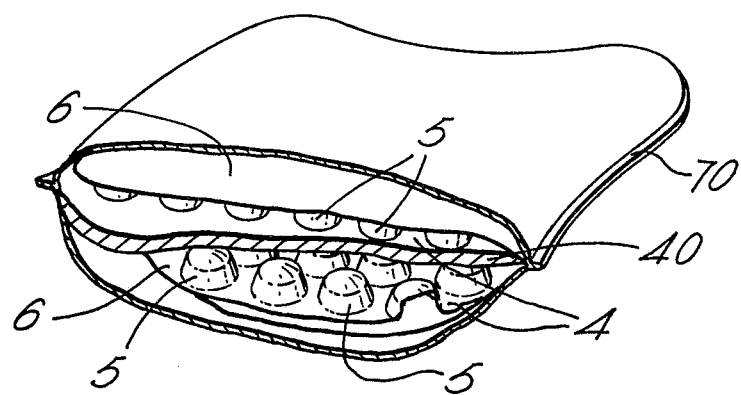
FIG. 10a is an exploded cross sectional view of an alternative form of a shin pad.

FIGS. 10 and 10a of the drawings show a shin pad 1 having a layer of foam material 40 such as for example a foam rubber material between two layers of a resilient and shock absorbing material 4. This lends the protective device to being flexible for the purpose of following the contours of the leg or limb of a user and the like. Referring to FIG. 10, the corner 50 of the pad is shown as having the layers of shock absorbing material 4 cut off at an angle so that only the foamed material 40 extends into corners of the pad. This enables the corners to be bent to fit legs of users and the like. The upper end of the pad 1 is scooped or concave as at 51, to assist in allowing the pad to conform to the body or limb contours.

The layers of shock absorbing material 4 are located in juxtaposition one with the other, within the outer covering 3 and the outer covering is then stitched in one form of the invention such as about the periphery thereof as at 60 in FIGS. 1 and 2 and may also be stitched substantially centrally thereof, as indicated at 61 in FIGS. 1, 2 and 5 or within the protective device as defined by the outer edges thereof, so as to form sections of air pockets and/or shock absorbing material, within the device, to further provide an added cushioning effect when forces or pressure is applied to the protective device.

The shock absorbing material is preferably in the form of a plastics material such as for example polyvinylchloride, or such as for example in the form of polythene, rubber and the like which materials are resilient but at the same time are capable of forming air pockets which provide for a degree of flexibility and shock absorption. Other materials such as for example other weldable materials and the like, are able to be used to equal advantage.

In a form of the invention as shown in FIGS. 3, 4 and 10 of the accompanying drawings, the cover 3 of the outer covering is formed of a plastics material or other weldable material and the inner layers 4 are formed of a suitable weldable, shock absorbing material such as for example a plastics material such as for example polyvinylchloride. Thus, the edges of the outer covering are secured together by high frequency welding, radio frequency welding and the like (hereinafter referred to as "heat sealing"), such as along the lines 70 indicated in the accompanying drawings and sections of the protective device can be formed into compartments by heat sealing the outer covering together, as at 71 together with the inner layers of juxtaposed shock absorbing material so as to form compartments 72 within the protective device.

The present invention provides for means to enable the location of the protective device relative to the user.

In the present invention, a shin pad is provided with means on a leading or front face thereof, so that once the shin pad is located in position, about the shin of a user, a sock and the like may be pulled up over the shin pad and means may be provided to engage with the sock or the material of the sock, so as to locate the sock in an up position and to thus locate the shin pad in a position behind the sock, which assists in its location. In other forms of the invention, protective devices can engage with other articles of clothing.

In this form of the invention, at least one and as shown in FIGS. 1 and 5 of the accompanying drawings, two layers 80 of a suitable location material 81 such as for example an easy stick or Velcro (registered trade mark) material are provided such as with a plurality of hooks such as nylon hooks, which on coming into contact with similar hook material or wool, brushed or rough material, such as might form a stocking or sock, will engage therewith in a substantially releasable locking engagement so that they will hold the sock in an up position and the shin pad or protective device in a located position, but which will enable them to be parted one from the other on a pressure or force being applied to one or the other (or both), such as by a user or wearer.

In the form of the invention shown in FIGS. 1 and 5 of the accompanying drawings, two substantially parallel and spaced apart strips 80 of material 81 are provided on a front face of the shin pad or protective device, to facilitate the desired location of the shin pad. The layers or strips 80 are integrally formed with or suitably attached by stitching, moulding, bonding and the like, to the cover material of the protective device. This is however by way of example only and one or more than two may be provided if desired.

Alternatively other means of location may be provided, such as for example domes, hooks, buttons and the like.

Referring to FIG. 3 of the accompanying drawings, one or more straps 90 and buckles 91 may be provided extending rearwardly of the protective device if desired, such as to enable location of the shin pad or at least additional location if desired. It is envisaged that the strap(s) may be wholly or partially formed of an elastic or stretch material so as not to restrict the blood circulation of users. In this respect, it is envisaged that where the present invention has particular application to pads such as for example cricket pads, hockey pads and the like, a plurality of such straps and buckles may be provided along the length thereof to provide for the location of the protective device.

Referring now to FIGS. 7, 8 and 9 of the accompanying drawings.

These figures of the drawings show views of a fetlock cover such as may be used for a horse and the like.

The fetlock cover 105 is shown as consisting basically in the provision of a rectangular protective device, having an outer covering 3 formed on for example one side thereof 3a, with a waterproofed or outer type material such as vinyl, leather, plastics and the like, and on the other side 3b of the covering with a soft material such as for example a polyester or soft brushed material such as may come into contact with the skin of a user.

As will be seen from FIG. 7 of the accompanying drawings, location or engagement means are provided, in the form of a plurality of attachment strips 110 provided on one side end of the cover 105; attachment tongues 111 extend outwardly from an opposite side end. The attachment tongues 111 and attachment strips 110 are formed or provided, on corresponding or co-acting sides or faces, with a brushed material, Velcro (registered trade mark) strips or a nylon hook type material to provide for ready engagement one with the other. In another form of the invention the side ends of the cover 105 may be provided with buttons and buttonholes, or alternatively domes and eyes, or any other suitable means of attachment, for example straps and buckles.

Thus, on the device being wrapped about the fetlock or leg of a horse, (for example in the form shown in FIG. 7) and on the engagement or location means being engaged one with the other, the protective device or cover will be held in position.

In one form of the invention the straps 111 are attached inwardly of the side end or edge 3d of the cover so as to provide an overlap edge portion 3e which in use wraps around under the inner surface 3b for secure engagement.

As with previous forms of the invention the outer covering provides an outer covering for the protective device and houses at least one layer of shock absorbing material formed of a sheet of suitable material formed or provided with a plurality of air pockets therein, such as hereinbefore described.

In one form of the invention as shown in FIG. 9 of the accompanying drawings, two spaced apart layers of shock absorbing material 30 and 31 may be located within the covering 3 and may be spaced apart on from the other by a layer of a foamed material 21, this adding to the resilience and shock absorbing qualities of the device; this may have equal application to other forms of the invention as well.

The layers of material forming the cover may be stitched or heat sealed together and about the location of the securing strips.

It should be appreciated that this invention has been described by way of example only and that improvements and modifications may be made to the invention without departing from the spirit thereof as defined by the appended claims.

I claim:

1. A protective device including a plurality of layers of substantially resilient and shock absorbent material; the layers of substantially resilient and shock absorbent material being provided in juxtaposition one with the other and within an outer covering; the substantially resilient and shock absorbent material being sheet material formed or provided with a plurality of integral, open faced pockets therein; a backing sheet being provided with each layer of substantially resilient and shock absorbent material so as to enclose the pockets and the arrangement being such that the substantially resilient and shock absorbent material within said outer covering, provides a protective cushioning when a blow or force is applied thereto.

2. A protective device as claimed in claim 1 and wherein means are provided to locate the protective device in or about the area for which protection is required.

3. A protective device as claimed in claim 2 and wherein the means to locate the protective device, is in the form of at least one strip of attachment material secured to an outer surface of said protective device.

4. A protective device as claimed in claim 2 and wherein the means to locate the protective device on or about the area for which protection is required, is in the form of a hooked material on an outer face of said device, said hooked material being attachable to, or engageable with, an adjacent surface, to thus facilitate location of said protective device.

5. A protective device as claimed in claim 1 and wherein one or more layers of a foamed material are provided adjacent, and/or between said substantially resilient and shock absorbent material and/or said outer covering, and within said protective device.

6. A device for the protection of human limbs, including a plurality of juxtaposed layers of substantially resilient and shock absorbent material in the form of sheets of material formed or provided with a plurality of integrally formed, open faced studs or pockets therein; a backing material being provided so as to enclose said studs or pockets and so as to form air pockets; an outer covering being provided about said substantially resilient and shock absorbent material; and device being profiled to conform substantially to the limb(s) of a user; an outer surface of the device being formed or provided with means to locate the device on or adjacent an area for which protection is required.

7. A protective device as claimed in claim 1 for use as a fetlock protector for horses; wherein at least one section or strip of locating material extends outwardly from one side end thereof and wherein another side end of the device is provided with a substantially corresponding section or strip and the arrangement being such that on the protective device being wrapped about the fetlock of a horse, the locating material will engage with the substantially corresponding section or strip on the other side end of the device, so as to locate the protective device in position.

* * * * *